US010994777B2

(12) United States Patent
Buchwitz et al.

(10) Patent No.: US 10,994,777 B2
(45) Date of Patent: May 4, 2021

(54) WHEEL STEERING APPARATUS TO GENERATE POSITIVE ACKERMANN

(71) Applicant: Ford Global Technologies, LLC, Dearborn, MI (US)

(72) Inventors: Joe L. Buchwitz, Huntington Woods, MI (US); Geoffrey Lawrence Gordon, Novi, MI (US); John Wesley Stanley, Belleville, MI (US); James Adam Drozdowski, Chelsea, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 92 days.

(21) Appl. No.: 16/031,476

(22) Filed: Jul. 10, 2018

(65) Prior Publication Data

US 2020/0017142 A1    Jan. 16, 2020

(51) Int. Cl.
  *B62D 7/14*  (2006.01)
  *B60G 3/20*  (2006.01)
  *B62D 7/20*  (2006.01)

(52) U.S. Cl.
  CPC ............. *B62D 7/146* (2013.01); *B60G 3/202* (2013.01); *B62D 7/20* (2013.01); *B60G 2200/44* (2013.01)

(58) Field of Classification Search
  CPC .......... B62D 7/146; B62D 7/20; B62D 17/00; B60G 3/202; B60G 2200/44
  USPC ..................................................... 280/93.502
  See application file for complete search history.

(56) References Cited

U.S. PATENT DOCUMENTS

| 2,682,311 | A | * | 6/1954 | Bishop | .................... | B64C 25/50 |
| | | | | | | 180/429 |
| 2,766,051 | A | * | 10/1956 | Chapman | ................. | B62D 7/22 |
| | | | | | | 280/93.507 |
| 2,810,596 | A | * | 10/1957 | Elam | ....................... | B62D 7/16 |
| | | | | | | 403/118 |
| 4,522,416 | A | * | 6/1985 | Sano | .................... | B62D 7/1527 |
| | | | | | | 180/410 |
| 4,705,135 | A | * | 11/1987 | Kawamoto | .......... | B62D 7/1545 |
| | | | | | | 180/236 |
| 4,799,703 | A | * | 1/1989 | Mueller | ................. | B60G 3/202 |
| | | | | | | 280/124.135 |
| 4,815,762 | A | * | 3/1989 | Jurr | ........................ | B60G 7/006 |
| | | | | | | 280/124.141 |

(Continued)

FOREIGN PATENT DOCUMENTS

| CN | 202138411 | | 2/2012 | | |
| DE | 4015974 | A1 * | 12/1990 | ........... | B60G 21/051 |

(Continued)

OTHER PUBLICATIONS

Machine Translation of JP-60197413-A (Year: 1985).*

*Primary Examiner* — James A English
*Assistant Examiner* — Kurtis Nielson
(74) *Attorney, Agent, or Firm* — Raymond Coppiellie; Hanley, Flight & Zimmerman, LLC

(57) ABSTRACT

Vehicle suspension systems are described herein. An example apparatus includes a cam pivotably coupled to a rear axle. The example apparatus also includes a first tie rod having a first end pivotably coupled to the cam and a second end pivotably coupled to a steering knuckle. The example apparatus also includes a second tie rod having a first end pivotably coupled to the cam outboard relative to the first end of the first tie rod and a second end coupled to a steering actuator.

18 Claims, 12 Drawing Sheets

(56) References Cited

U.S. PATENT DOCUMENTS

| | | | | |
|---|---|---|---|---|
| 4,943,074 A * | 7/1990 | Kido | .................... | B62D 7/1527 |
| | | | | 180/409 |
| 7,841,606 B2 * | 11/2010 | Rey | ......................... | B62D 3/12 |
| | | | | 180/427 |
| 8,714,574 B2 | 5/2014 | Glanzer et al. | | |
| 8,864,153 B2 | 10/2014 | Luttinen et al. | | |
| 2006/0208445 A1 * | 9/2006 | Gideon | ................. | B60G 9/022 |
| | | | | 280/124.116 |
| 2011/0089657 A1 * | 4/2011 | Shibuya | .................. | B60G 3/18 |
| | | | | 280/93.512 |

FOREIGN PATENT DOCUMENTS

| | | | | |
|---|---|---|---|---|
| DE | 4219185 A1 * | 12/1992 | ............ | B62D 17/00 |
| DE | 102004053723 | 5/2006 | | |
| DE | 102004053726 | 5/2006 | | |
| EP | 2141062 | 1/2010 | | |
| JP | 60197413 A * | 10/1985 | ............ | B60G 7/006 |
| JP | 60215406 A * | 10/1985 | ............ | B62D 7/146 |
| JP | 61085276 A * | 4/1986 | ............ | B62D 7/146 |

\* cited by examiner

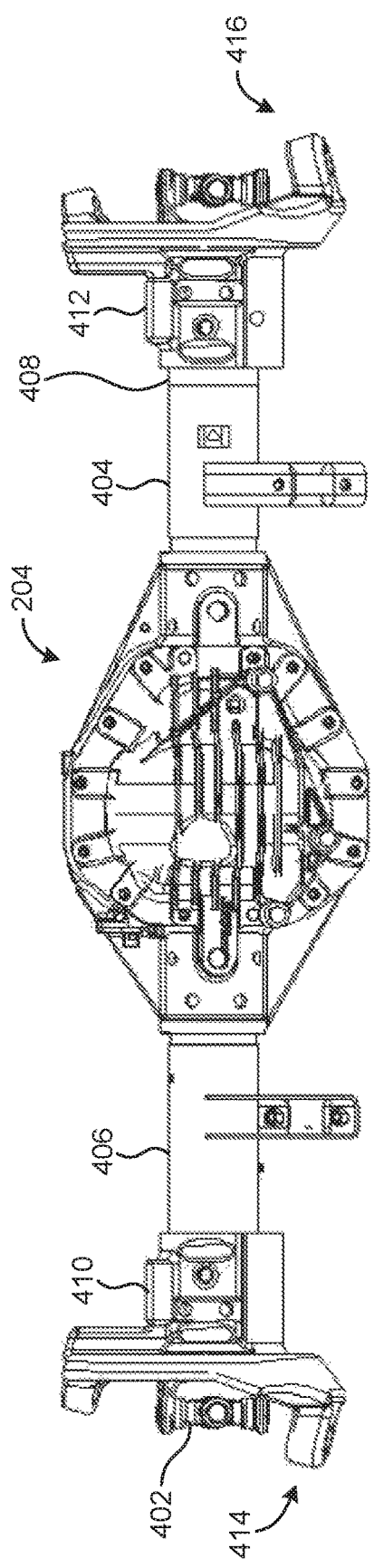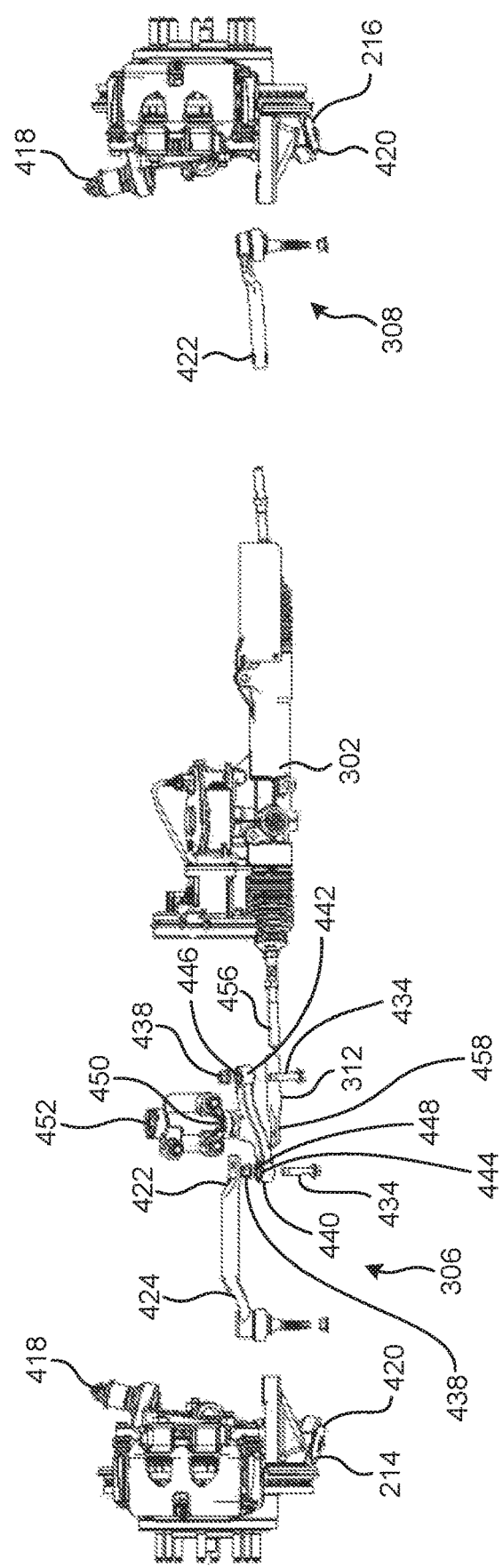
FIG. 4

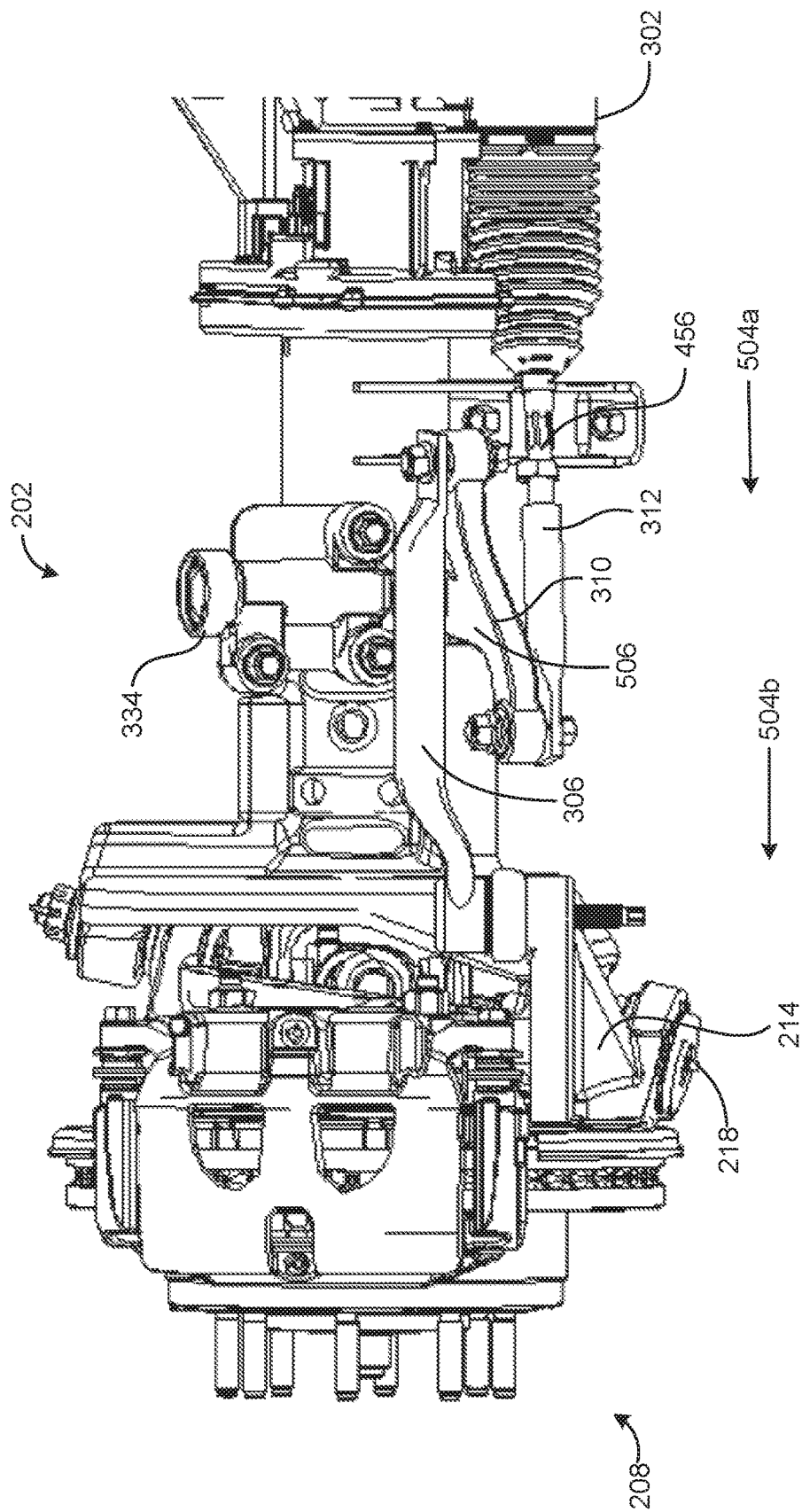

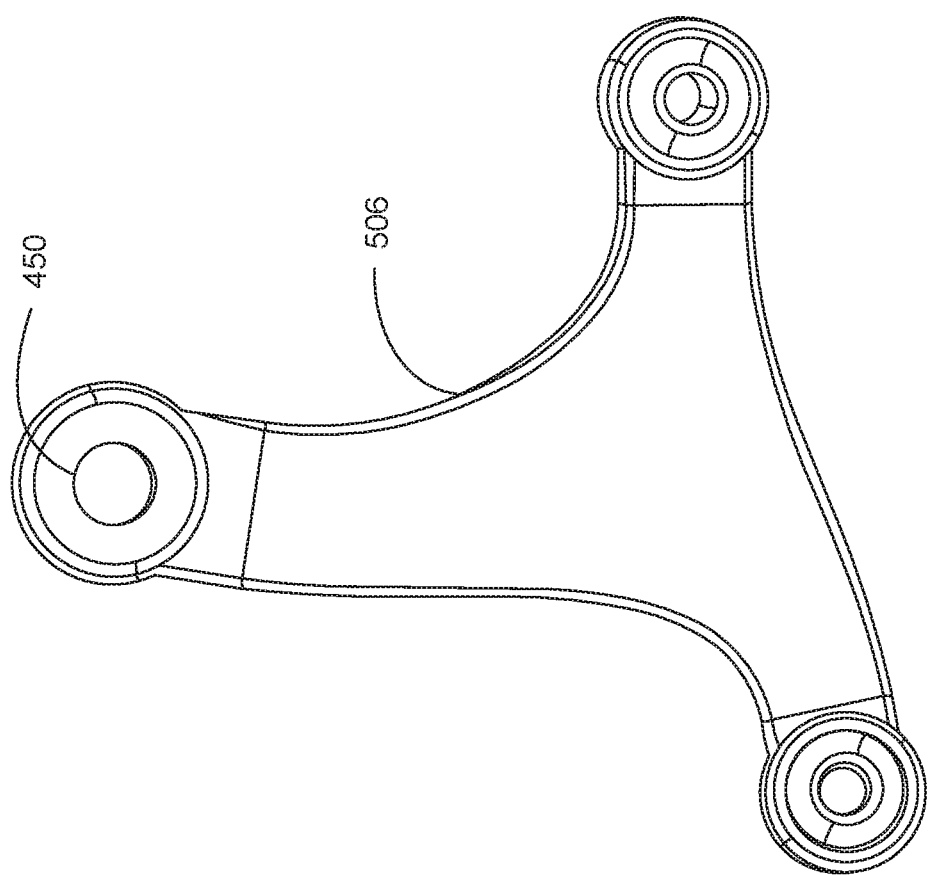

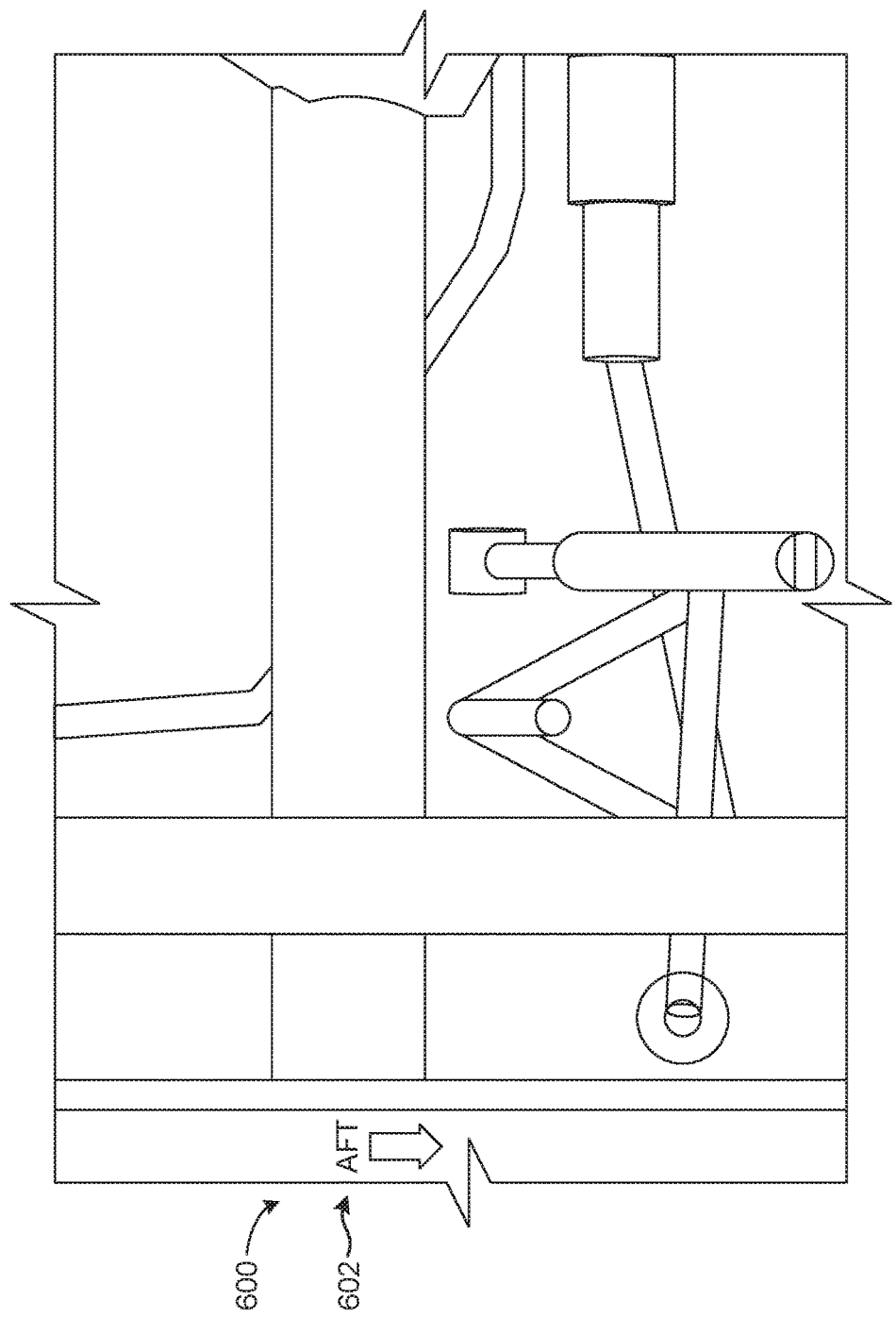

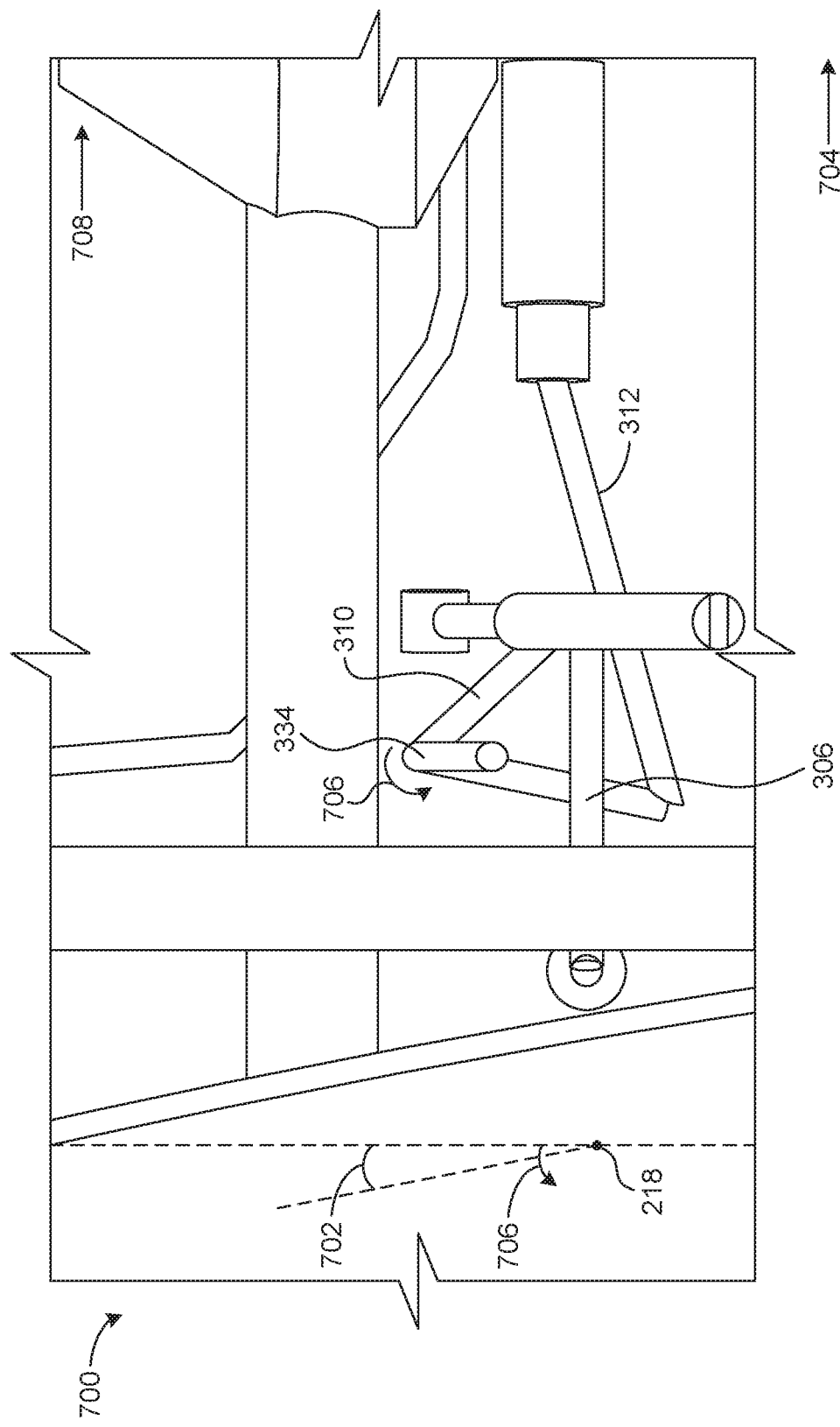

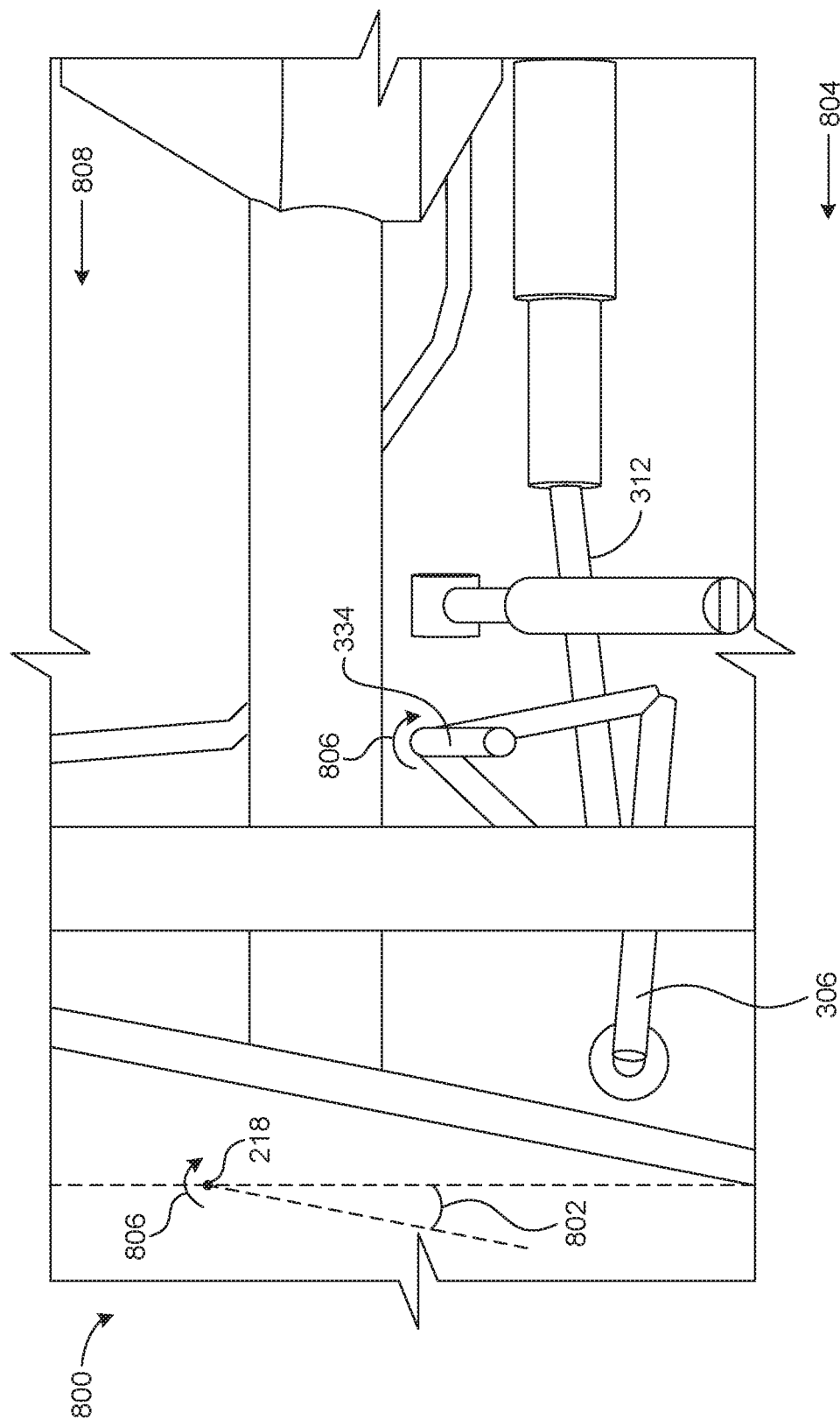

US 10,994,777 B2

WHEEL STEERING APPARATUS TO GENERATE POSITIVE ACKERMANN

FIELD OF THE DISCLOSURE

This disclosure relates generally to vehicle suspensions and, more particularly, to rear wheel steering apparatus to generate positive Ackermann.

BACKGROUND

Ackermann steering geometry enables mechanically linked steerable wheels to move together simultaneously during turning and steering movements. However, in some instances, space constraints of a vehicle suspension prevent desired Ackermann geometry between steering components, thereby resulting in less than desired Ackermann (e.g., negative Ackermann) and reducing vehicle maneuverability, handling and/or performance. For example, solid axles with rear wheel steering capability often generate negative rear wheel Ackermann due to various components (e.g., driveshaft package, brake package, etc.) that interfere with a desired mounting location of rear wheel steering components.

SUMMARY

An example apparatus includes a cam pivotably coupled to a rear axle. The example apparatus also includes a first tie rod having a first end pivotably coupled to the cam and a second end pivotably coupled to a steering knuckle. The example apparatus also includes a second tie rod having a first end pivotably coupled to the cam outboard relative to the first end of the first tie rod and a second end coupled to a steering actuator.

An example apparatus includes a cam pivotably coupled to a rear axle housing. The example apparatus also includes inner and outer tie rods pivotably coupled to the cam in a cross-tie arrangement to cause the tie rods to move different lateral distances when the cam pivots relative to the rear axle housing.

An example apparatus includes means for increasing Ackermann. The example apparatus also includes inner and outer tie rods pivotably coupled to the means for increasing Ackermann in a cross-tie arrangement to cause the tie rods to move different lateral distances.

BRIEF DESCRIPTION OF THE DRAWINGS

FIG. 4 is an exploded view of the example axle and wheel apparatus assembly of FIG. 3.

FIGS. 5A-5D illustrate a partial, perspective front view of the example wheel steering apparatus of FIGS. 2-4.

FIG. 6 is a top, schematic view of a rear wheel of the example vehicle and the example wheel steering apparatus of FIGS. 1-5 showing the rear wheel in a straight position.

FIG. 7 is a top, schematic view of the rear wheel of the example vehicle and the example wheel steering apparatus of FIGS. 1-5 showing the rear wheel at a first steering angle.

FIG. 8 is a top, schematic view of the rear wheel of the example vehicle and the example wheel steering apparatus of FIGS. 1-5 showing the rear wheel at a second steering angle.

The figures are not to scale. Wherever possible, the same reference numbers will be used throughout the drawing(s) and accompanying written description to refer to the same or like parts.

DETAILED DESCRIPTION

Figure 1:
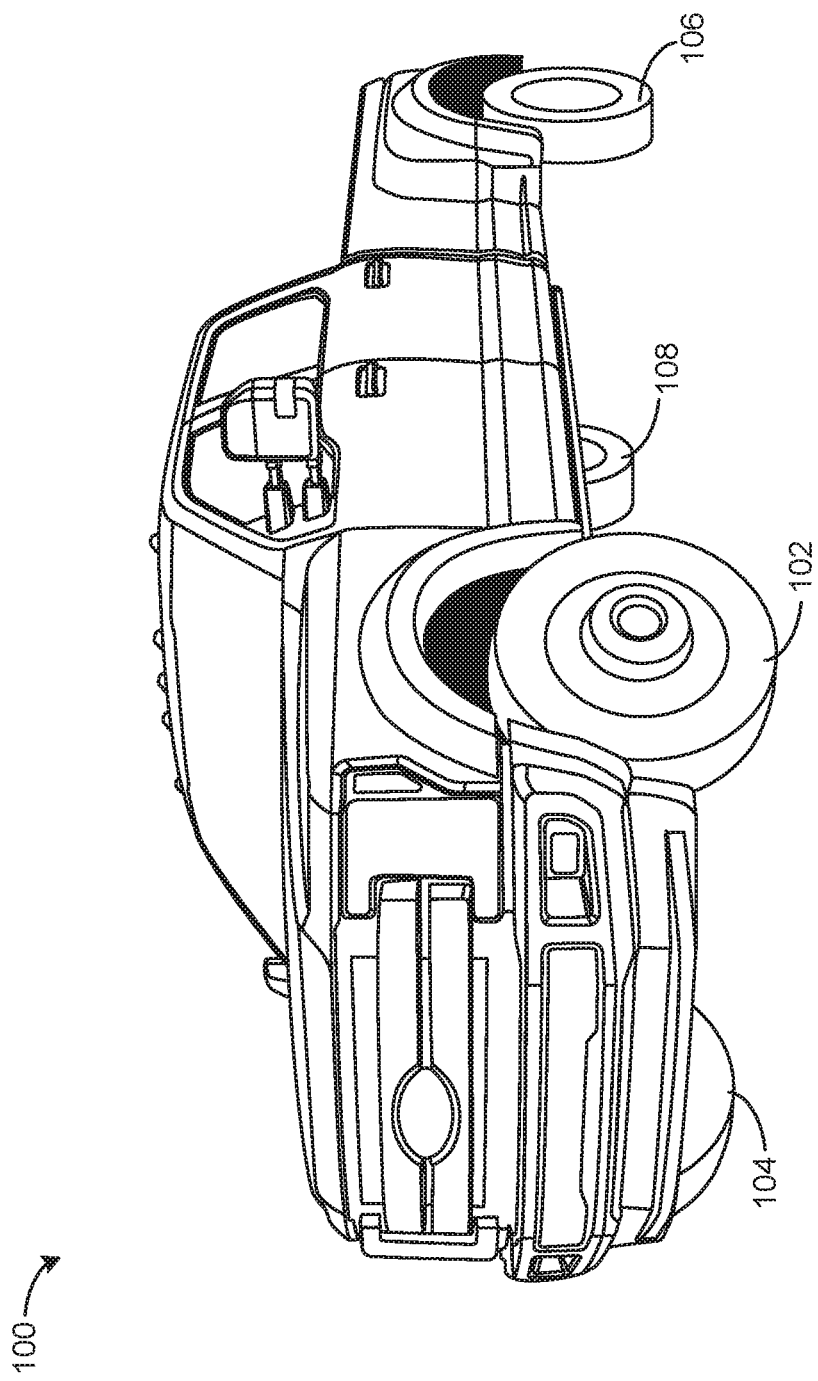
FIG. 1 represents an example vehicle that can be implemented with an example wheel steering apparatus in accordance with the teachings of this disclosure.

Ackerman geometry prevents tires of a vehicle from turning about different points during a vehicle turning event. When the tires of a vehicle turn relative to different points (e.g., different center points relative to a radius of curvature of a turning path of the vehicle), the wheels fight each other to force the vehicle to turn about the point about which each tire is turning. As a result, one or more of the tires drag in a direction slightly different from that in which the vehicle is steered, causing the tires to scrub against the ground and wear. Solid axle rear suspension systems typically include non-steerable rear wheels. For non-steerable rear wheel suspensions, Ackerman geometry is configured such that each of the front wheels and the rear wheels turn about a common turning point during a turning event.

To improve handling and/or vehicle performance, some vehicles utilize all-wheel steering functionality. Rear wheel steering enables rear wheels of a vehicle to provide steering in addition to front wheels to improve vehicle handling, vehicle maneuverability, and/or performance. Implementing a four-wheel steering system (e.g., front and rear wheel steerability) requires Ackermann accommodation for all four wheels to improve vehicle maneuverability (e.g., avoid or reduce tire scrubbing during turning).

Positive Ackermann prevents or reduces tire scrubbing during turning while negative Ackermann does not reduce (e.g., increases) tire scrubbing. Thus, positive Ackermann is typically desired. For example, positive Ackermann allows the front wheels and the rear wheels of a four-wheel steer vehicle to rotate around a common center point (e.g., located between a front axle and a rear axle) during turning to reduce (e.g., minimize or eliminate) tire scrubbing and/or tire wear and/or improve vehicle handling and/or maneuverability. Typically, 100 percent Ackermann is not desired, due to trade-offs relating to higher speed handling and/or steering. However, a moderate level of positive Ackermann is desired to reduce tire scrubbing and/or tire wear. For example, positive Ackermann of approximately between 40 percent and 60 percent significantly reduces tire scrubbing, tire wear and/or significantly improves vehicle maneuverability, handling and/or other characteristic(s).

Some vehicles employing rear-wheel steering generate negative Ackermann (e.g., negative Ackermann percentages) due to space constraints that prevent desired Ackerman geometry of steering components. In other words, a desired, positive Ackermann geometry cannot be achieved. For example, a driveshaft assembly (e.g., a rear differential housing or casing), a brake package, shock absorbers, and/or other vehicle components associated with a solid rear axle (e.g., a Hotchkiss solid rear axle) can interfere with a desired mounting location of rear wheel steering apparatus (e.g., a steering actuator and tie rod/knuckle interface). As a result, such a rear suspension assembly can exhibit negative Ackermann. The negative Ackermann can cause excessive tire wear or scrubbing, turn diameter performance degradation, undesirable noise condition(s) and/or reduced vehicle maneuverability and/or performance characteristic(s). For example, negative Ackermann can cause excessive tire scrubbing and/or tire wear during a low-speed turning event, thereby providing unwanted or undesired steering influence degrading comfort and performance to vehicle passengers.

For example, due to Ackermann geometry restrictions, an inner rear wheel can have a steering angle that is less than a steering angle of an outer rear wheel, thereby delivering negative Ackermann during a turning event. Negative Ackermann, for example, can cause a front driver-side wheel and a rear driver-side wheel to rotate about a first common point and can cause a front passenger-side wheel and a rear passenger-side wheel to rotate about a second common point different than the first common point during a turning event (e.g., a left-handed turn).

An example wheel steering apparatus disclosed herein produces positive (e.g., rear) Ackermann for an all-wheel steering vehicle. Specifically, an example wheel steering apparatus disclosed herein can be employed with a solid rear axle (e.g., a Hotchkiss solid rear axle). For example, the wheel steering apparatus disclosed herein enables rear wheel steering capability while generating positive Ackermann. In some examples, steering apparatus disclosed herein produce approximately between positive 40 percent and positive 60 percent Ackermann. In some examples, an example steering apparatus disclosed herein can be configured to generate less than positive 40 percent Ackermann (e.g., between zero percent and 40 percent (e.g., 30 percent)) or more than positive 60 percent Ackermann (e.g., between 60 percent and 100 percent (e.g., 75 percent)). Additionally, example steering wheel apparatus disclosed herein generate positive or improved Ackermann for vehicles having space constraints.

An example apparatus disclosed herein includes a cam pivotably coupled to a rearward facing side of a rear axle. In some examples, the cam is pivotably coupled to the rear axle via an idler joint. The example apparatus also includes a first tie rod having a first end pivotably coupled to the cam and a second end pivotably coupled to a steering knuckle. The example apparatus also includes a second tie rod having a first end pivotably coupled to the cam outboard relative to the first end of the first tie rod and a second end coupled to a steering actuator. In some examples, the cam is shaped to cause the tie rods to move different lateral distances when the cam pivots relative to the rear axle. The different lateral distances can increase Ackermann at wheels coupled to the rear axle. In some examples, the first ends of the tie rods are vertically spaced relative to each other. The cam is shaped to vertically space the first ends of the tie rods, for example. In some examples, the cam is plate shaped. The example cam has a first arm pivotably coupled to the rear axle, a second arm pivotably coupled to the first end of the first tie rod, and a third arm opposite the second arm, the third arm pivotably coupled to the first end of the second tie rod. In some examples, the rear axle includes a second cam pivotably coupled to the rear axle to cause third and fourth tie rods to move different lateral distances when the second cam pivots relative to the rear axle. In some examples, the cam creates a cross-tie arrangement between the tie rods.

FIG. 1 is an example vehicle 100 that can implement the teachings of this disclosure. The vehicle 100 of the illustrated example includes front wheels 102, 104 supported by a front suspension and rear wheels 106, 108 supported by a rear suspension. The front suspension associated with the front wheels 102, 104 provides steerability to the front wheels 102, 104. Likewise, the rear suspension associated with the rear wheels 106, 108 provides steerability to the rear wheels 106, 108. The vehicle 100 can be a body-on-frame construction or unibody construction. In some examples, the vehicle 100 can be a truck as depicted in FIG. 1. The example teachings of this disclosure can be implemented with any type of suspension (e.g., a steerable suspension, a non-steerable suspension) and/or any other types of vehicles (e.g., passenger vehicles, military vehicles, etc.)

Figure 2:
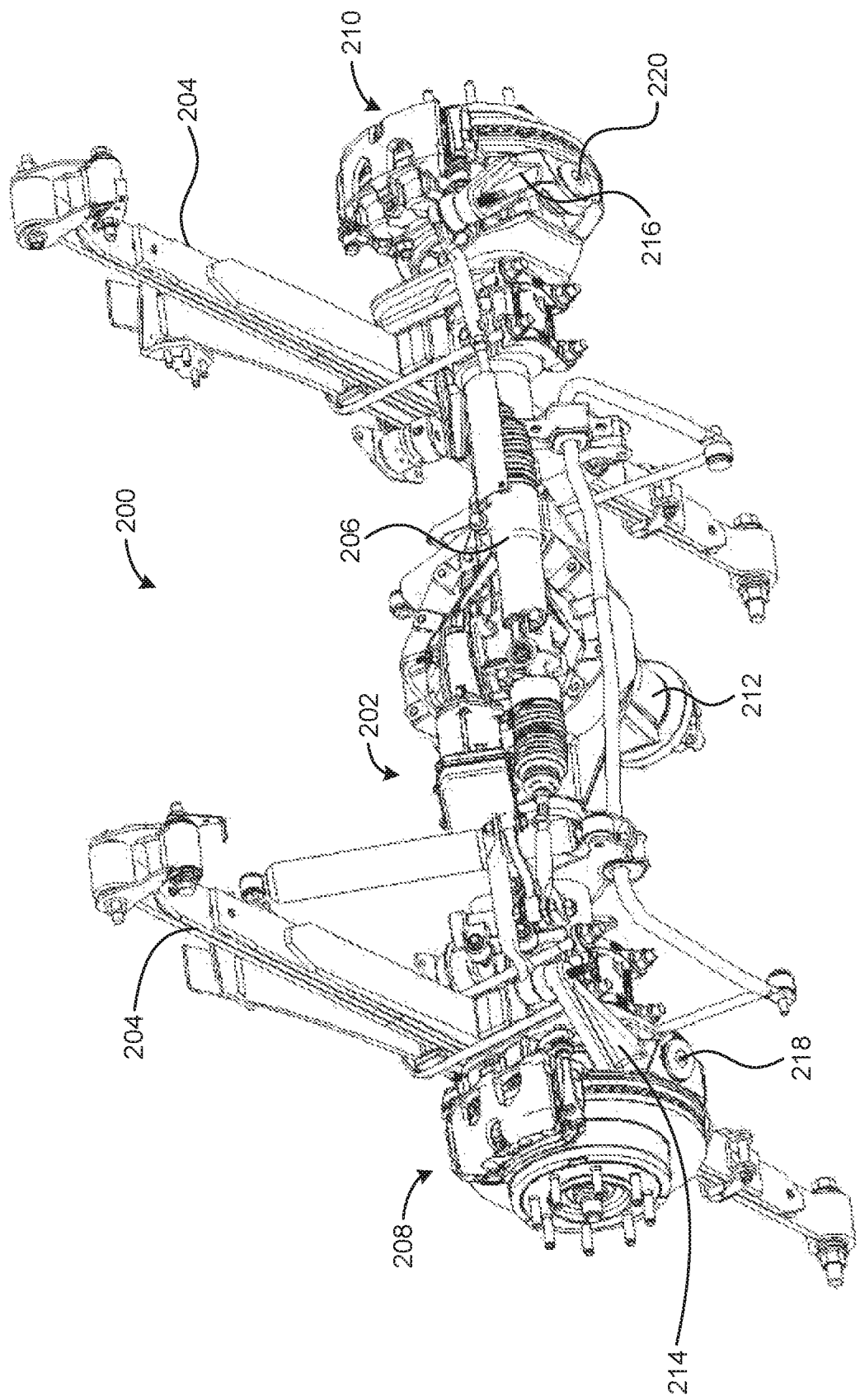
FIG. 2 is a perspective, bottom view of an example vehicle suspension of the example vehicle of FIG. 1 implemented with the example wheel steering apparatus disclosed herein.

FIG. 2 is an example vehicle suspension 200 of the vehicle 100 of FIG. 1 implemented with an example steering apparatus 202 (e.g., a steering assembly) in accordance with teachings of this disclosure. The vehicle suspension 200 of the illustrated example can implement the rear suspension (e.g., a steerable solid axle, leaf spring suspension) associated with the rear wheels 106, 108 (FIG. 1) of the vehicle 100. To provide lateral stability to the vehicle 100 and provide an anti-roll stabilizer, the vehicle suspension 200 of the illustrated example includes a biasing element or leaf spring system 204. For example, the vehicle suspension 200 of the illustrated example is a steerable, solid axle suspension configuration commonly referred to as a Hotchkiss suspension. Although the vehicle suspension 200 is described in connection with the rear suspension or a rear solid axle, leaf spring suspension (e.g., a Hotchkiss suspension), the teachings of the disclosure can also be applied to a front suspension (e.g., of the vehicle 100 associated with the front wheels 102, 104 (FIG. 1), a steer by wire suspension) and/or any other type of suspension(s) (e.g., solid axle suspensions having coil springs, air springs with multi-links and/or any other biasing element, suspensions of a vehicle that support steerable wheel assemblies and/or non-steerable wheel assemblies, etc.).

Referring to FIG. 2, the vehicle suspension 200 of the illustrated example includes a rear axle 206 (e.g., a steerable, rear axle) to couple the rear wheels 106, 108 (FIG. 1) of the vehicle 100 to a chassis or frame of the vehicle 100. Specifically, the rear axle 206 of the illustrated example includes a wheel assembly 208 (e.g., a first or left-side wheel assembly) to support the rear wheel 106 (FIG. 1) and a wheel assembly 210 (e.g., a second or right-side wheel assembly) to support the rear wheel 108 (FIG. 1). The rear axle 206 of the illustrated example includes an axle shaft 402 (FIG. 4) rotatably coupled within a solid axle housing or axle tube 404 (FIG. 4). The axle shaft 402 rotates within the axle tube 404 to provide rotational movement to the wheel assembly 208 and the wheel assembly 210. A differential 212 (e.g., differential gearing) couples to a powertrain (e.g., via a driveshaft) and distributes driving torque to the rear wheels 106, 108 (FIG. 1) of the vehicle 100 via the axle shaft 402 (FIG. 4) and the wheel assemblies 208.

The steering apparatus 202 of the illustrated example provides steering capability to the wheel assembly 208 and the wheel assembly 210. To allow for steerability of the wheel assemblies 208, 210 (FIG. 2) and, thus, the rear wheels 106, 108 (FIG. 1) of the vehicle 100, the vehicle suspension 200 of the illustrated example includes left and right-side knuckles 214, 216. Specifically, the left-side wheel assembly 208 pivots or rotates relative to the rear axle 206 via the left-side knuckle 214 about a pivot 218 (e.g., a pivot axis) and the right-side wheel assembly 210 pivots or rotates relative to the rear axle 206 via the right-side knuckle 216 about a pivot 220 (e.g., a pivot axis). In this manner, the knuckle 214 of the illustrated example transfers steering actuation from the steering apparatus 202 to the mounted wheel assembly 208 and the knuckle 216 of the illustrated example transfers steering actuation from the steering apparatus 202 to the mounted wheel assembly 210.

Figure 3:
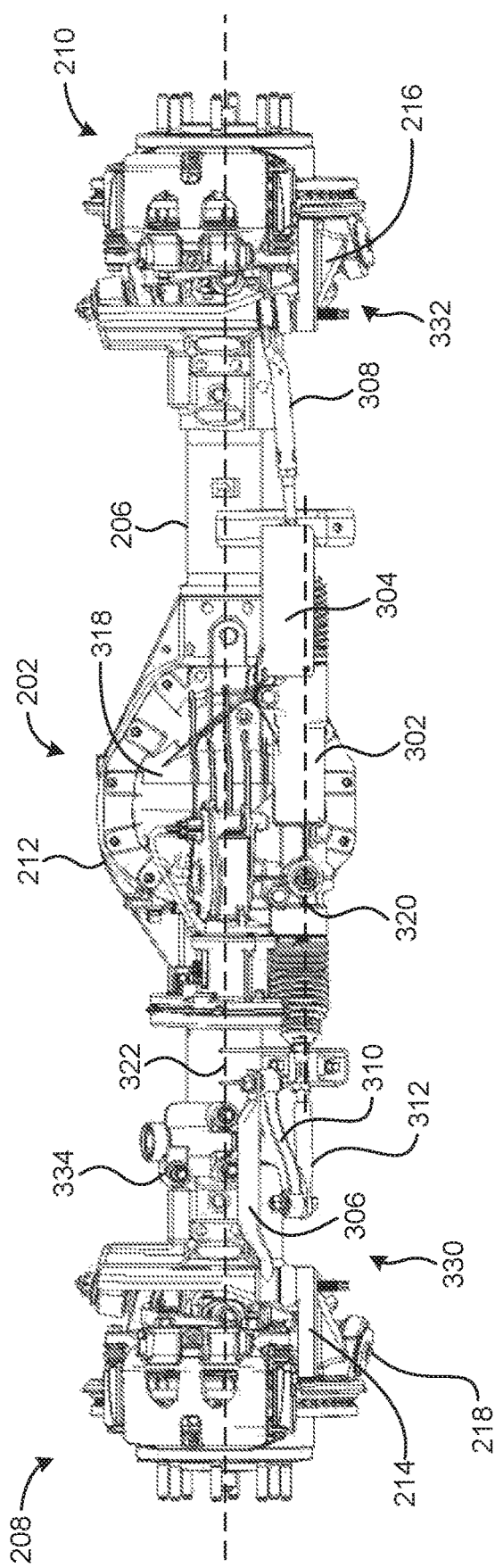
FIG. 3 is an assembled, perspective bottom view of an example axle and the example wheel steering apparatus of the example vehicle suspension of FIG. 2.

FIG. 3 is a perspective view of the rear axle 206 of FIG. 2. The steering apparatus 202 of the illustrated example includes a steering actuator 302 (e.g., a rack and pinion actuator) operated by a motor 304, outer tie rods 306, 308, a cam plate 310, and an inner tie rod 312. The outer tie rod 306, the inner tie rod 312, and the cam plate 310 are associated with and/or steer the left-side wheel assembly 208 and the outer tie rod 308 is associated with and/or steers the right-side wheel assembly 210. The steering actuator 302 of the illustrated example is a rack and pinion actuator. In some examples, the steering actuator 302 can be a linear actuator, a hydraulic actuator, and/or any other actuator to generate linear or translational motion.

The outer tie rod 306 couples to the knuckle 214 and the outer tie rod 308 couples to the knuckle 216. The cam plate 310 couples the outer tie rod 306 to the steering actuator 302 via the inner tie rod 312. Thus, the outer tie rod 306, the cam plate 310, and the inner tie rod 312 of the steering apparatus 202 moves or pivots the knuckle 214 about the pivot 218, which turns the wheel assembly 208 and, thus, the rear wheel 106 during a steering event.

The steering actuator 302 of the illustrated example is coupled or mounted to the rear axle 206. Specifically, the steering actuator 302 is coupled (e.g., mounted) to the rear axle 206 and/or the differential 212. In some examples, the steering actuator 302 couples or mounts to a rear surface 318 (e.g., a rear cover) of the differential 212 (e.g., a casing of the differential 212). The steering actuator 302 of the illustrated example has a longitudinal axis 320 that is substantially parallel relative to a longitudinal axis 322 of the rear axle 206. As used herein, the term "substantially" implies approximately rather than perfectly. Thus, the longitudinal axis 320 can be approximately parallel (e.g., within 5% tolerance) relative to the longitudinal axis 322 or perfectly parallel relative to the longitudinal axis 322. For example, the steering actuator 302 of the illustrated example is positioned aft of the longitudinal axis 322 and/or the rear axle 206 of the vehicle suspension 200.

The cam plate 310 transfers translational motion (e.g., lateral movement) of the steering actuator 302 aft of the rear axle 206 to rotational motion of the knuckles 214, 216 via respective tie rod/knuckle interfaces 330, 332. The cam plate 310 of the illustrated example creates a cross-tie rod arrangement between the outer tie rod 306 and the inner tie rod 312. As such, the cam plate 310 moves the outer tie rod 306 and the inner tie rod 312 different lateral distances to increase Ackermann at the wheels 106, 108 coupled to the rear axle 206.

To transfer translational motion of the steering actuator 302 to translational motion of the outer tie rod 306 and, thus, rotational motion of the knuckle 214, the cam plate 310 is pivotably coupled to the rear axle 206 via an idler joint 334. The cam plate 310 pivots or rotates about the idler joint 334 to transfer translational motion of the steering actuator 302 to translational motion (e.g., lateral movement) of the outer tie rod 306. As described in greater detail below, the steering actuator 302 positioned aft of the rear axle 206 and the cam plate 310 generates positive Ackermann. In some examples, the steering actuator 302 can be located fore of the rear axle 206 and the cam plate 310 can be located aft of the rear axle 206. In some examples, the steering actuator 302 can be located on a top side or bottom side of the rear axle 206 and the cam plate 310 can be located on the other one of the top side or bottom side.

FIG. 4 is an exploded view of the rear axle 206 of FIG. 2. The knuckle 214 of the illustrated example is coupled (e.g., mounted) to a first end 406 of the rear axle 206 to enable the rear wheel 106 to pivot relative to the rear axle 206. The knuckle 216 of the illustrated example is coupled (e.g., mounted) to the second end 408 of the rear axle 206 to enable the rear wheel 108 to pivot relative to the rear axle 206. Specifically, a yoke 410 couples the knuckle 214 to the first end 406 of the rear axle 206 (e.g., the axle tube 404) and a yoke 412 couples the knuckle 216 to the second end 408 of the rear axle 206 (e.g., the axle tube 404). The knuckle 214 of the illustrated example attaches to a knuckle-receiving portion 414 of the yoke 410 and the knuckle 216 of the illustrated example attaches to a knuckle-receiving portion 416 of the yoke 412. For example, each of the yokes 410, 412 of the illustrated example receives a ball joint 418 (e.g., a ball stud or fastener) and a ball joint 420 (e.g., a ball or fastener) to pivotably couple the knuckles 214, 216 to the respective yokes 410, 412.

The outer tie rod 306 of the illustrated example couples the knuckle 214 to the cam plate 310. Each of the outer tie rods 306, 308 of the illustrated example includes a first tie rod end 422 and a second tie rod end 424 opposite the first tie rod end 422. The first tie rod end 422 of the outer tie rod 306 couples to the cam plate 310 and the second tie rod end 424 of the outer tie rod 306 couples to the knuckle 214.

The cam plate 310 of the illustrated example includes a first end 440 and a second end 442 opposite the first end 440. The first end 440 of the cam plate 310 couples to the inner tie rod 312 and the second end 442 of the cam plate 310 couples to the first tie rod end 422 of the outer tie rod 306.

The first end 440 of the respective cam plate 310 defines an opening 444 and the second end 442 of the respective cam plate 310 defines an opening 446. Specifically, the opening 446 of the cam plate 310 receives a tie rod end fastener 434 of the outer tie rod 306 and the opening 444 of the cam plate 310 receives a tie rod end fastener 434 of the inner tie rod 312. Fasteners 438 (e.g., nuts) couple (e.g., attach or mount) the first tie rod end 422 to the respective second end 442 of the cam plate 310, while a fastener 438 couples the inner tie rod 312 to the first end 440 of the cam plate 310. The openings 444, 446 include or receive bearings 448 to enable rotation or pivotal motion between the cam plate 310 and the outer tie rod 306 and inner tie rod 312. Additionally, the cam plate 310 of the illustrated example includes an opening 450 positioned between the first end 440 and the second end 442 that is to receive a fastener 452. The fastener 452 couples the respective cam plate 310 to the idler joint 334 and, in turn, to the rear axle 206 and/or the axle tube 404. To enable the cam plate 310 to pivot relative to the rear axle 206 about the respective idler joint 334, the opening 450 of the cam plate 310 can include a bearing.

The inner tie rod 312 includes a rod 456 coupled to the steering actuator 302 (e.g., a rack gear of the steering actuator 302) at a first end. The rod 456 of the inner tie rod 312 receives the first end 440 of the cam plate 310 via a tube 458. In some examples, the rod 456 and the tube 458 can be adjusted (e.g., the rod 456 positioned within the tube 458 at different lengths) to a length that increases Ackermann.

Figure 5C:
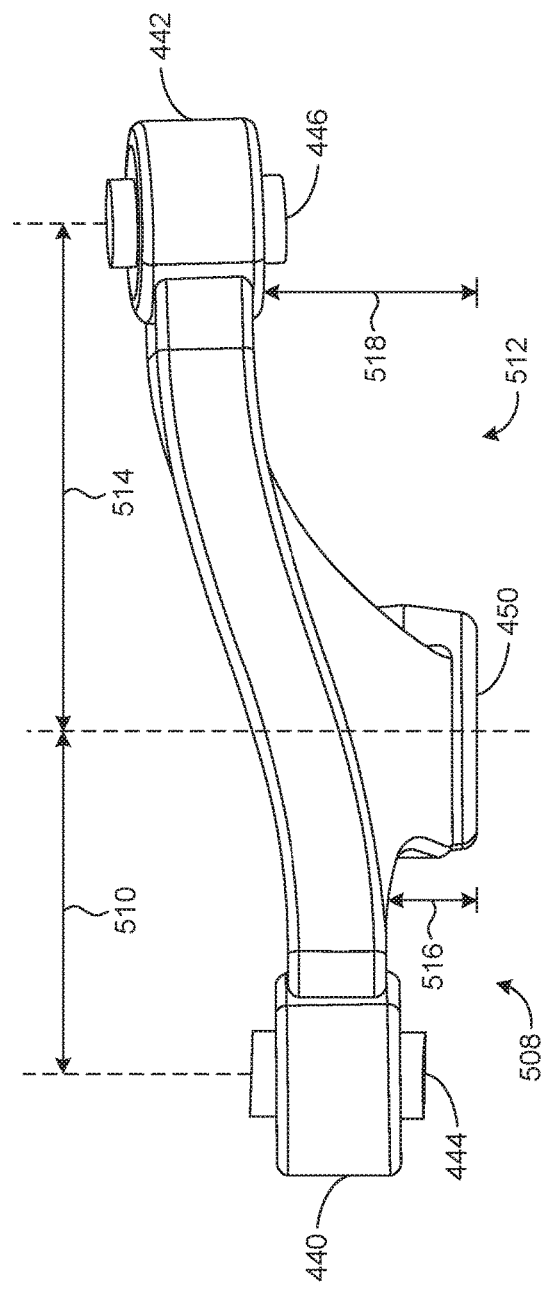

FIGS. 5A-5D are an enlarged, partial perspective view of the steering apparatus 202 of FIGS. 2-3. FIG. 5A shows components of a left-side (e.g., a rear driver side) of the steering apparatus 202 of FIGS. 2-4 of FIG. 2, but it will be appreciated that similar components, configured for the right-side of the steering apparatus 202, can be provided to form a full suspension as shown, for example, in FIGS. 2-4. For clarity, the rear axle 206 is not shown in FIGS. 5A-5D. The rod 456 of the inner tie rod 312 is movable (e.g., slidably movable) relative to the steering actuator 302. Thus, as the rod 456 moves in a first direction 504a via the steering actuator 302, the cam plate 310 pivots or rotates relative to the rear axle 206 about the idler joint 334 to cause the outer tie rod 306 to move in a second direction 504b, which in turn causes the knuckle 214 rotate about the pivot 218.

Figure 5D:
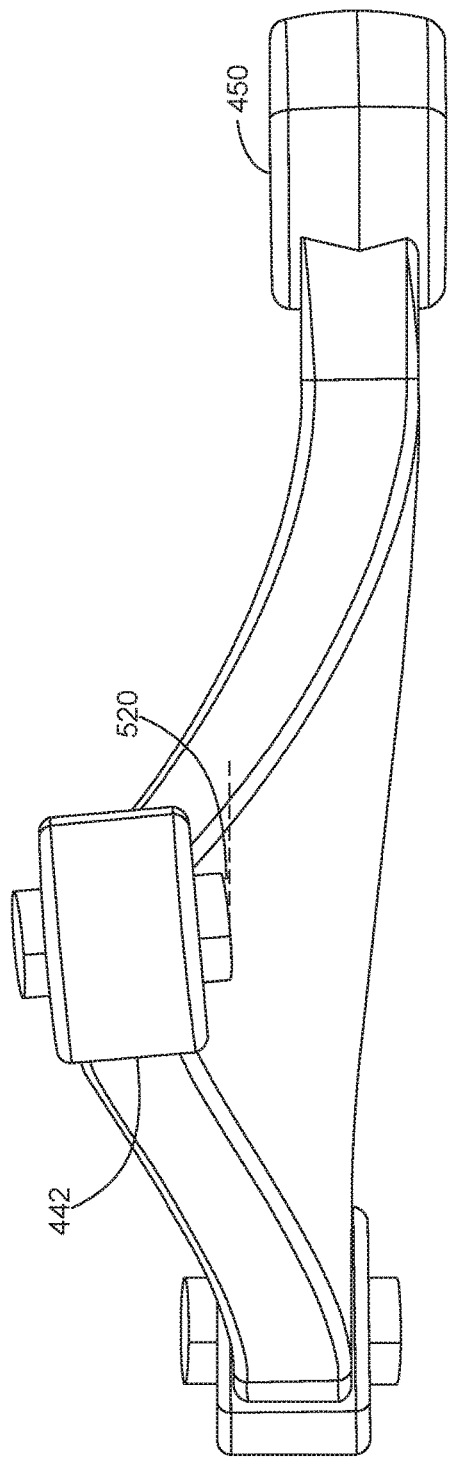

FIGS. 5B-5D illustrate an example means for increasing Ackermann. In some examples, the means for increasing Ackermann is the example cam plate 310. Due to constraints under the vehicle 100 when the vehicle suspension 200 is coupled to the vehicle 100, the cam plate 310 of the illustrated example includes a body 506 having an arcuate or curved shape or profile. However, in some examples, the body 506 and/or the cam plate 310 can have a substantially straight (e.g., non-curved) profile and/or any other geometric profile suitable for transferring motion from the steering actuator 302 to the outer tie rods 306, 308. The body 506 of the illustrated example has a first portion 508 defining a first length 510 between the opening 444 and the opening 450, and a second portion 512 defining a second length 514 between the opening 446 and the opening 450. The opening 450 of the illustrated example is positioned between the openings 444 and 446. The opening 450 and, thus, the idler joint 334 of the illustrated example is positioned or located at a distance between the first end 440 and the second end 442. In some examples, the opening 450 and/or the idler joint 334 can be located closer to the opening 444 and/or the first end 440, or closer to the opening 446 and/or the second end 442. The body 506 of the illustrated example has an arched shape. In some examples, the first end 440 of the cam plate 310 is raised a first vertical distance 516 above the opening 450, and the second end 442 is raised a second vertical distance 518 above the opening 450. The first distance 516 is smaller than the second distance 518 to vertically space the inner tie rod 312 from the outer tie rod 306. In some examples, the second end 442 is at a first angle 520 relative to a surface of the opening 450.

In some examples, a curvature of the body 506 and/or a location of the idler joint 334 between the first end 440 and the second end 442 can amplify or increase a lateral distance of the outer tie rod 306 relative to a translational distance of the inner tie rod 312. For example, when the steering actuator 302 causes the inner tie rod 312 to move a first distance (e.g., one inch) in the first direction 504a, the cam plate 310 can cause the outer tie rod 306 to move a second distance (e.g., an inch and a half) in the second direction 504b that is greater than the first distance, and vice versa. Such configuration of the cam plate 310 enables the inner tie rod 312 to be smaller (e.g., shorter in length in the longitudinal direction) than would otherwise be required to move the outer tie rod 306 to pivot or rotate the knuckle 214 to a desired rotational position.

Referring to FIG. 5A, the steering apparatus 202 of the illustrated example generates positive Ackermann. Specifically, the steering apparatus 202 skews to one side as the rear wheels 106, 108 (FIG. 1) turn during a turning event. As a result, an inside wheel (e.g., the rear wheel 106 and/or wheel assembly 208) can be positioned at a steering angle (e.g., toe angle about the pivot 218) that is greater than a steering angle (e.g., a toe angle about the pivot 220) of an outside wheel (e.g., the rear wheel 108 and/or the wheel assembly 210) during a turning event, allowing the inside wheel to steer at a tighter radius. The positive rear Ackermann generated by the steering apparatus 202 can be varied (e.g., increased or decreased) by adjusting (e.g., increasing or decreasing) the dimensional characteristics (e.g., lengths, profiles, shapes, etc.) of the outer tie rods 306, 308, the inner tie rods 312, the cam plate 310, the knuckles 214, 216 and/or any other dimensional envelope of the steering apparatus 202. In some examples, a dimensional characteristic (e.g., a shape, a curvature, a length, etc.) of the cam plate 310 can be varied to achieve different amounts of positive rear Ackermann. For example, the cam plate 310 can have a substantially straight (e.g., non-curved) profile while maintaining vertical spacing between the inner tie rod 312 and outer tie rod 306. For example, a tie rod having a length that is greater than a length of the outer tie rod 306 can be employed to vary (e.g., increase or decrease) rear Ackermann. For example, an inner tie rod and/or a cam plate having a length that is greater than a length of respective the inner tie rod 312 and/or the cam plate 310 can be employed to vary (e.g., increase or decrease) rear Ackermann. In other words, adjusting or modifying a dimensional characteristic of the steering apparatus 202 varies (e.g., increases or decreases) an amount of positive rear Ackermann performance provided by the steering apparatus 202 and/or the vehicle 100.

As noted above, the steering apparatus 202 of the illustrated example generates positive rear Ackermann. Unlike known rear wheel steering apparatus, the steering apparatus 202 of the illustrated example enables an inner wheel (e.g., the rear wheel 106) to move at a greater toe-out angle (e.g., to cut more) than a toe-in angle of an outer wheel (e.g., the rear wheel 108) during a turning event (e.g., a left turn event), thereby producing positive rear Ackermann (e.g., 40 percent rear Ackermann).

FIGS. 6-8 are top, schematic illustrations of the rear wheel 106 and the vehicle suspension 200 of FIGS. 2-5. FIG. 6 illustrates the rear wheel 106 positioned in a straight position 600. To position the rear wheel 106 in the straight position 600, the steering actuator 302 is in a first position 602 (e.g., an initial position).

FIG. 7 illustrates the rear wheel 106 positioned at an outer wheel cut position 700 having a first steering angle 702 (e.g., a toe angle or toe-out configuration). To position the rear wheel 106 at the first steering angle 702, the steering actuator 302 causes the inner tie rod 312 (e.g., the rod 456) to move in a first direction 704. In turn, the cam plate 310 pivots about the idler joint 334 in a first rotational direction 706 (e.g., a counter-clockwise direction in the orientation of FIG. 7) and causes the outer tie rod 306 to move in a second direction 708. In turn, the outer tie rod 306 causes the wheel assembly 208 and, thus, the rear wheel 106 to rotate about the pivot 218 in the first rotational direction 706 in the orientation of FIG. 7 to the first steering angle 702.

FIG. 8 illustrates the rear wheel 106 positioned at an inner wheel cut position 800 having a second steering angle 802 (e.g., a toe angle or toe-in configuration). To position the rear wheel 106 at the second steering angle 802, the steering actuator 302 causes the inner tie rod 312 (e.g., the rod 456) to move in a third direction 804. In turn, the cam plate 310 pivots about the idler joint 334 in a second rotational direction 806 (e.g., a clockwise direction in the orientation of FIG. 8) and causes the outer tie rod 306 to move in a fourth direction 808. In turn, the outer tie rod 306 causes the wheel assembly 208 and, thus, the rear wheel 106 to rotate about the pivot 218 in the second rotational direction 806 in the orientation of FIG. 8 to the second steering angle 802.

Front wheel Ackermann is often tracked at a 20-degree front wheel cut angle (e.g., 20-degree toe angle). In some examples, with front Ackermann tracked at a 20-degree front wheel cut angle, the steering apparatus 202 of the illustrated example can generate positive rear Ackermann when the rear wheel steering angle (e.g., the first steering angle 702 and/or the second steering angle 802) is greater than approximately between 2 and 5 degrees. Additionally, in some such examples, positive rear Ackermann generated by the steering apparatus 202 increases (e.g., linearly, non-linearly, etc.) with increasing rear wheel steering angles (e.g., increasing the steering angles 702 and/or 802). For example, at a 20-degree front wheel cut angle, the steering apparatus 202 of the illustrated example can generate positive rear Ackermann between approximately 20 percent and 50 percent when the rear wheel steering angle (e.g., the first steering angle 702 and/or the second steering angle 802) increases between approximately 5 degrees and 9 degrees. Thus, in such an example, positive rear Ackermann increases as the rear wheel steering angle increases. In some examples, when the front wheels 102, 104 are at a full wheel out position (e.g., the front wheels 102, 104 are at full wheel cut angle or full-lock position), the steering apparatus 202 can produce or generate positive rear Ackerman of between approximately 35 percent and 60 percent when the rear wheel steering angle (e.g., the first steering angle 702 or the second steering angle 802) is between approximately 9 degrees and 12 degrees.

In contrast with known steering assemblies (e.g., the outer tie rods, the inner tie rods, the steering actuator, etc.) of rear wheel steer on solid axles that are positioned on one side (e.g., aft) of a rear axle generate negative rear Ackermann of approximately 40 percent for front wheel Ackermann tracked at 20-degrees. Additionally, such known systems generate decreasing rear Ackermann with increased wheel cut angles. For example, for front wheel Ackermann tracked at 20-degree front wheel cut angle, rear Ackermann generated by known steering assemblies positioned on a solid axle generate between approximately negative 40 percent and negative 60 percent for rear wheel steering angles of between approximately 5 degrees and 9 degrees. Similarly, with the front wheels at full lock, known rear steering assemblies positioned on solid axles produce negative rear Ackermann of between approximately negative 20 percent and negative 40 percent for rear wheel steering angles of between approximately 3 degrees and 12 degrees. Such negative rear Ackermann is generated when the rear wheel steer on a solid axle (e.g., a steering actuator and tie rod/knuckle interface) is positioned aft of the rear axle. On the contrary, the steering apparatus 202 of the illustrated example significantly improves vehicle handling and performance.

Figure 9A:
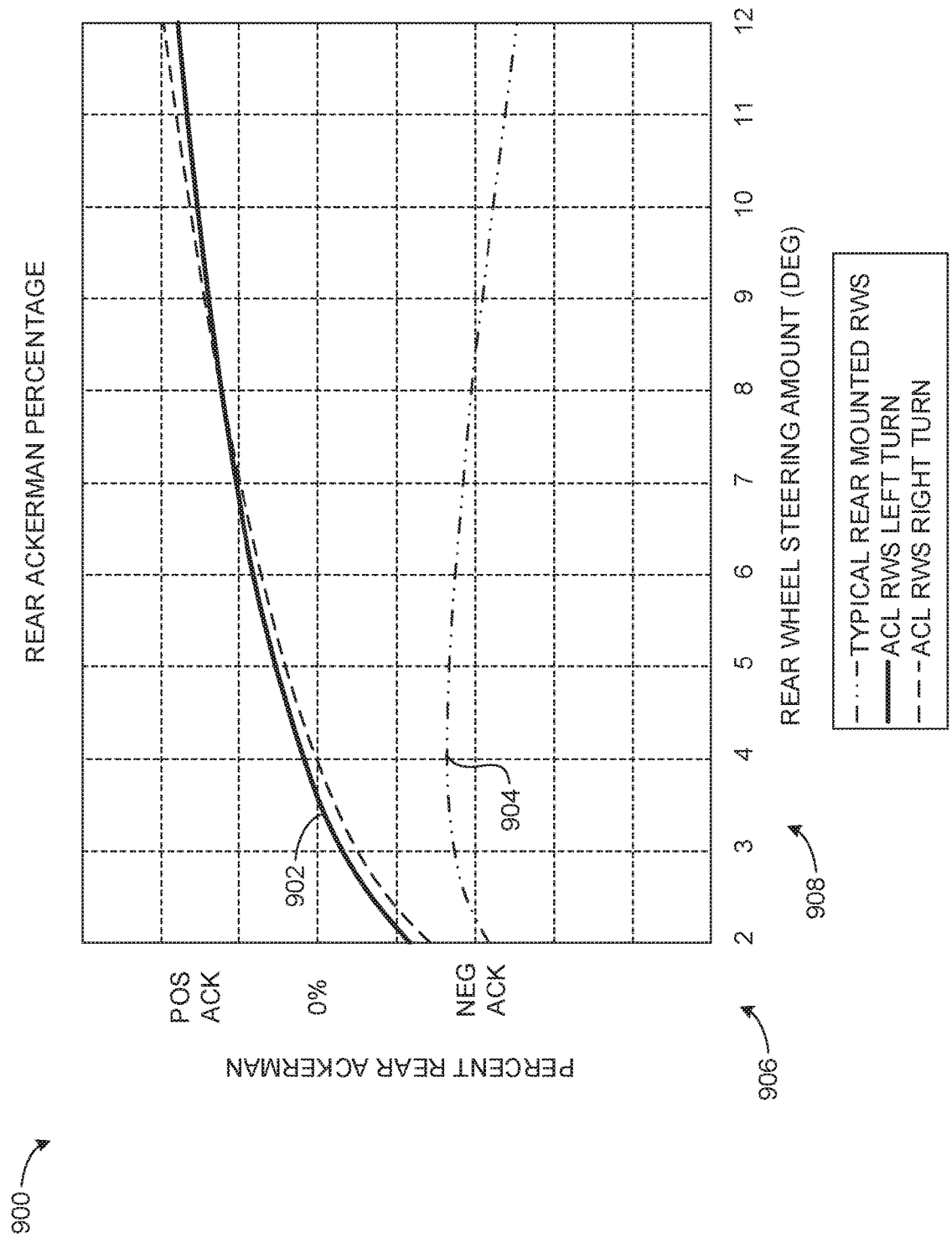
FIGS. 9A and 9B illustrate graphs representative of rear Ackermann produced by example wheel steering apparatus and/or the suspension apparatus disclosed herein.
Figure 9B:
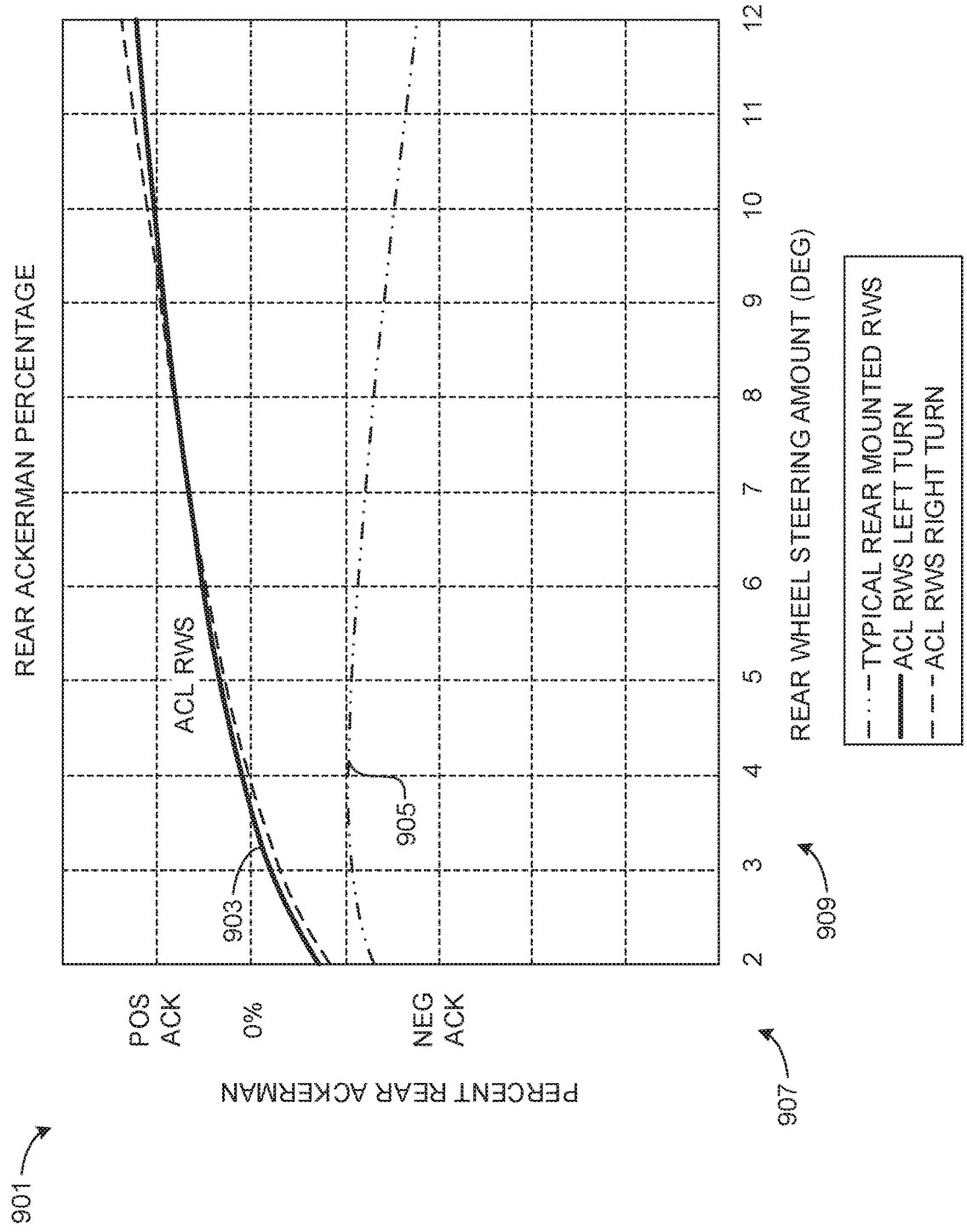

FIGS. 9A and 9B illustrate graphs 900 and 901 representative of rear Ackermann produced by the example steering apparatus 202 and/or the suspension apparatus 200 disclosed herein. FIG. 9A illustrates a graph 900 of rear Ackermann percentage based on a first front wheel Ackermann (e.g., a front wheel Ackermann tracked at 20-degree front wheel cut angle, a front wheel Ackermann tracked at 40-degree front wheel cut angle, etc.). Specifically, the graph 900 includes a first line 902 representative of rear Ackermann provided by the cam plate 310 disclosed herein and a second line 904 representative of rear Ackermann provided by a conventional rear steering assembly (e.g., that does not employ the cam plate 310). A percent of rear Ackermann 906 is represented by the y-axis and a degree of rear wheel steering 908 (e.g., a cut-angle) is represented by the x-axis. As shown in FIG. 9A, the percent of rear Ackermann 906 provided by the steering apparatus 202 that is represented by the first line 902 increases (e.g., non-linearly) with an increase in the degree of rear wheel steering 908. On the contrary, the percent of rear Ackermann 906 provided by the conventional steering and/or suspension systems that is represented by the second line 904 decreases with an increase in the degree of rear wheel steering 908.

FIG. 9B illustrates a graph 901 of rear Ackermann percentage based on a second front wheel Ackermann (e.g., the front wheels at full lock, etc.). Specifically, the graph 901 includes a first line 903 representative of rear Ackermann provided by the cam plate 310 disclosed herein and a second line 905 representative of rear Ackermann provided by a conventional rear steering assembly (e.g., that does not employ the cam plate 310). A percent of rear Ackermann 907 is represented by the y-axis and a degree of rear wheel steering 909 (e.g., a cut-angle) is represented by the x-axis. As shown in FIG. 9B, the percent of rear Ackermann 907 provided by the steering apparatus 202 that is represented by the first line 903 increases (e.g., non-linearly) with an increase in the degree of rear wheel steering 909. On the contrary, the percent of rear Ackermann 907 provided by the conventional steering and/or suspension systems that is represented by the second line 905 decreases with an increase in the degree of rear wheel steering 909.

The following paragraphs provide various examples of the examples disclosed herein.

Example 1 can be a cam pivotably coupled to a rear axle, a first tie rod having a first end pivotably coupled to the cam and a second end pivotably coupled to a steering knuckle, and a second tie rod having a first end pivotably coupled to the cam outboard relative to the first end of the first tie rod and a second end coupled to a steering actuator.

Example 2 includes the steering apparatus of example 1, wherein the cam is pivotably coupled to the rear axle via an idler joint.

Example 3 includes the steering apparatus of any one of examples 1-2, wherein the cam is pivotably coupled to a rearward facing side of the rear axle.

Example 4 includes the steering apparatus of any one of examples 1-3, wherein the cam is shaped to cause the tie rods to move different lateral distances when the cam pivots relative to the rear axle.

Example 5 includes the steering apparatus of any one of examples 1-4, wherein the different lateral distances increases Ackermann at wheels coupled to the rear axle.

Example 6 includes the steering apparatus of any one of examples 1-5, wherein the first ends of the tie rods are vertically spaced relative to each other.

Example 7 includes the steering apparatus of any one of examples 1-6, wherein the cam is shaped to vertically space the first ends of the tie rods.

Example 8 includes the steering apparatus of any one of examples 1-7, wherein the cam is plate shaped.

Example 9 includes the steering apparatus of any one of examples 1-8, wherein the cam has a first arm pivotably coupled to the rear axle, a second arm pivotably coupled to the first end of the first tie rod, and a third arm opposite the second arm, the third arm pivotably coupled to the first end of the second tie rod.

Example 10 includes the steering apparatus of any one of examples 1-9, further comprising a second cam pivotably coupled to the rear axle to cause third and fourth tie rods to move different lateral distances when the second cam pivots relative to the rear axle.

Example 11 can be a cam pivotably coupled to a rear axle housing, and inner and outer tie rods pivotably coupled to the cam in a cross-tie arrangement to cause the tie rods to move different lateral distances when the cam pivots relative to the rear axle housing.

Example 12 includes the steering apparatus of example 11, wherein the cross-tie arrangement vertically spaces the tie rods.

Example 13 includes the steering apparatus of any one of examples 11-12, wherein the cam is plate-shaped.

Example 14 includes the steering apparatus of any one of examples 11-13, wherein the cam has a first arm pivotably coupled to the rear axle housing, a second arm pivotably coupled to the inner tie rod, and a third arm coupled to the outer tie rod.

Example 15 includes the steering apparatus of any one of examples 11-14, wherein the different lateral distances increase Ackermann at wheels coupled to the rear axle.

Example 16 includes the steering apparatus of any one of examples 11-15, wherein the cam is pivotably coupled to the rear axle via an idler joint.

Example 17 can be means for increasing Ackermann, and inner and outer tie rods pivotably coupled to the means for increasing Ackermann in a cross-tie arrangement to cause the tie rods to move different lateral distances.

Example 18 includes the steering apparatus of example 17, wherein the means for increasing Ackermann is shaped to vertically space the inner and outer tie rods.

Example 19 includes the steering apparatus of any one of the examples 17-18, wherein the means for increasing Ackermann is pivotably coupled to a rear axle housing.

Example 20 includes the steering apparatus of any one of the examples 17-19, wherein the means for increasing Ackermann is plate shaped.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   a cam pivotably coupled to a rear axle, the cam including a first arm pivotably coupled to the rear axle, a second arm pivotably coupled to a first end of a first tie rod, and a third arm opposite the second arm, the third arm pivotably coupled to a first end of a second tie rod;
   the first tie rod having the first end pivotably coupled to the cam and a second end pivotably coupled to a steering knuckle, a portion of the first tie rod extending across a length of the cam; and
   the second tie rod having the first end pivotably coupled to the cam adjacent to the second end of the first tie rod and a second end coupled to a steering actuator.

2. The apparatus of claim 1, wherein the cam is pivotably coupled to the rear axle via an idler joint.

3. The apparatus of claim 1, wherein the cam is pivotably coupled to a rearward facing side of the rear axle.

4. The apparatus of claim 1, wherein the cam is shaped to cause the tie rods to move different lateral distances when the cam pivots relative to the rear axle.

5. The apparatus of claim 4, wherein the different lateral distances increases Ackermann at wheels coupled to the rear axle.

6. The apparatus of claim 1, wherein the first ends of the tie rods are vertically spaced relative to each other.

7. The apparatus of claim 6, wherein the cam is shaped to vertically space the first ends of the tie rods.

8. The apparatus of claim 1, wherein the cam is plate shaped.

9. The apparatus of claim 1, further comprising a second cam pivotably coupled to the rear axle to cause third and fourth tie rods to move different lateral distances when the second cam pivots relative to the rear axle.

10. An apparatus, comprising:
    a cam pivotably coupled to a rear axle housing, the cam including a first arm pivotably coupled to the rear axle housing, a second arm pivotably coupled to an inner tie rod, and a third arm pivotably coupled to an outer tie rod; and
    the inner and outer tie rods pivotably coupled to the cam in a cross-tie arrangement to cause the tie rods to move different lateral distances when the cam pivots relative to the rear axle housing, the cross-tie arrangement extending portions of the inner and outer tie rods across a length of the cam.

11. The apparatus of claim 10, wherein the cross-tie arrangement vertically spaces the tie rods.

12. The apparatus of claim 10, wherein the different lateral distances increases Ackermann at wheels coupled to the rear axle.

13. The apparatus of claim 10, wherein the cam is pivotably coupled to the rear axle via an idler joint.

14. The apparatus of claim 10, wherein the inner tie rod includes a first end pivotably coupled to the cam and a second end coupled to a steering actuator;
    the outer tie rod includes a first end pivotably coupled to the cam and a second end coupled to a steering knuckle; and
    the cross-tie arrangement positioning the first end of the inner tie rod adjacent to the second end of the outer tie rod.

15. An apparatus, comprising:
    means for increasing Ackermann, the means for increasing Ackermann including a first arm pivotably coupled to a rear axle, a second arm pivotably coupled to an inner tie rod, and a third arm pivotably coupled to an outer tie rod;
    the inner and outer tie rods pivotably coupled to the means for increasing Ackermann in a cross-tie arrangement to cause the tie rods to move different lateral distances, the cross-tie arrangement extending portions of the inner and outer tie rods across a length of the means for increasing Ackermann.

16. The apparatus of claim 15, wherein the means for increasing Ackermann is shaped to vertically space the inner and outer tie rods.

17. The apparatus of claim 15, wherein the means for increasing Ackermann is pivotably coupled to a rear axle housing.

18. The apparatus of claim 15, wherein the means for increasing Ackermann is plate shaped.

* * * * *